United States Patent
Morinaga et al.

(10) Patent No.: US 8,447,304 B2
(45) Date of Patent: May 21, 2013

(54) MOBILE COMMUNICATION SYSTEM AND ACCESS GATEWAY HAVING PLURAL USER PLANE AGWS

(75) Inventors: Yasutaka Morinaga, Kawasaki (JP); Koji Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 732 days.

(21) Appl. No.: 12/625,831

(22) Filed: Nov. 25, 2009

(65) Prior Publication Data

US 2010/0208653 A1 Aug. 19, 2010

(30) Foreign Application Priority Data

Feb. 13, 2009 (JP) ................................ 2009-030974

(51) Int. Cl.
*H04W 36/00* (2009.01)

(52) U.S. Cl.
USPC ........... 455/436; 455/438; 455/439; 455/453; 370/331; 370/245; 370/332

(58) Field of Classification Search
USPC ........... 455/453, 550.1, 410, 436–444, 435.1, 455/450; 370/331, 254, 255, 328, 332, 338, 370/352
See application file for complete search history.

(56) References Cited

U.S. PATENT DOCUMENTS

| 7,299,301 B1* | 11/2007 | Verma et al. | 709/249 |
|---|---|---|---|
| 2004/0052241 A1* | 3/2004 | Martin et al. | 370/351 |
| 2005/0143087 A1 | 6/2005 | Touati et al. | |
| 2006/0187838 A1* | 8/2006 | Alex et al. | 370/235 |
| 2007/0213060 A1* | 9/2007 | Shaheen | 455/436 |
| 2007/0258414 A1* | 11/2007 | Cheng et al. | 370/338 |
| 2009/0109933 A1* | 4/2009 | Murasawa et al. | 370/335 |
| 2010/0103872 A1* | 4/2010 | Park | 370/328 |

FOREIGN PATENT DOCUMENTS

| EP | 1 903 750 | 3/2008 |
|---|---|---|
| WO | WO 2009/002656 | 12/2008 |

OTHER PUBLICATIONS

C. Perkins, Ed.; RFC 3344-IP Mobility Support for IPv4; Nokia Research Center; Aug. 2002.
3rd Generation Partnership Project 2 "3GPP2"; Basic IP Service for Converged Access Network Specification; 3GPP2X.S0054-100-0; Version 1.0; Dec. 19, 2007.
JP Office Action for Japanese Application No. 2009-030974, Dispatch Date: Nov. 27, 2012.

* cited by examiner

*Primary Examiner* — Kamran Afshar
*Assistant Examiner* — Marisol Fahnert
(74) *Attorney, Agent, or Firm* — Antonelli, Terry, Stout & Kraus, LLP.

(57) ABSTRACT

In an access gateway (AGW) comprising a C-AGW for handling control messages and a plurality of U-AGWs for handling data packets, when a tunnel setup request is issued from one of base stations to hand over a mobile station, the C-AGW selects a new U-AGW being in the lowest load status out of the U-AGWs, estimates the load status of the new U-AGW in the case of changing the tunnel endpoint for the mobile station from a current U-AGW to the new U-AGW. The C-AGW designates the new U-AGW as the tunnel endpoint for the mobile station if the estimated load status satisfies a predetermined condition, but designates the current U-AGW as the tunnel endpoint if the estimated load status does not satisfy the predetermined condition.

12 Claims, 13 Drawing Sheets

FIG. 10

U-AGW STATUS TABLE 57

| U-AGW ADDRESS | USE RATE OF CPU | USE RATE OF BUFFER | OTHER INFORMATION |
|---|---|---|---|
| IP6-1 | xxxx | xxxx | xxxx |
| IP6-2 | xxxx | xxxx | xxxx |
| ⋮ | ⋮ | ⋮ | ⋮ |
| IP6-m | xxxx | xxxx | xxxx |

Columns: 571, 572, 573, 574

FIG. 11

QoS INFORMATION TABLE 58

| ATID | USER QoS PROFILE | | | |
|---|---|---|---|---|
| | PRIORITY | MAXIMUM BANDWIDTH | ALLOWED SERVICE CLASS | MAXIMUM CPU OCCUPATION RATE |
| AT20A | 1 | xxxx | xxxx | xxxx |
| AT20B | 2 | xxxx | xxxx | xxxx |
| ⋮ | ⋮ | ⋮ | ⋮ | ⋮ |

Columns: 581, 582 (582A, 582B, 582C, 582D)

FIG. 12

U-AGW ADDRESS TABLE 59

| ATID | U-AGW ADDRESS | BS ADDRESS | BINDING TYPE | |
|---|---|---|---|---|
| AT20A | IP6-1 | IP10A | PRIMARY | ~EN1 |
| AT20B | IP6-2 | IP10B | PRIMARY | ~EN2 |
| ⋮ | ⋮ | ⋮ | ⋮ | |

A mobile communication system comprises a core network, a plurality of base stations, and an access gateway connected to the base stations.

MOBILE COMMUNICATION SYSTEM AND ACCESS GATEWAY HAVING PLURAL USER PLANE AGWS

CLAIM OF PRIORITY

The present application claims priority from Japanese patent application serial No. 2009-030974, filed on Feb. 13, 2009, the content of which is hereby incorporated by reference into this application.

BACKGROUND OF THE INVENTION (1) Field of the Invention

The present invention relates to a mobile communication system and, more particularly, to a mobile communication system including an Access Gateway (AGW) located between a core network and an access network accommodating a plurality of base stations.

(2) Description of Related Art

In a wireless access network, a tunnel is established between a Base Station (BS) and an Access Gateway (AGW) and control messages and user data are transmitted through the tunnel, using a mobile IP (Mobile Internet Protocol) of the IETF (Internet Engineering Task Force). The tunnel of mobile IP is established by exchanging, for example, a Registration Request (RRQ) message and a Registration Reply (RRP) message of Proxy Mobile IP (PMIP) between the BS and the AGW. The formats of RRQ message and RRP message of PMIP are disclosed in IETF RFC3344, sections 3.1 and 3.2.

Meanwhile, in a wireless access network such as UMB (Ultra Mobile Broadband)/CAN (Converged Access Network) of 3rd Generation Partnership Project 2 (3GPP2), separation between a control plane for handling control messages and a user plane for handling user data is pursued. For example, 3GPP2 X. S0054-100-0 v1.0, sections 4.4 and 4.6, disclose that a data path and a signaling path are separated at an AGW.

FIG. 3 shows an example of a conventional wireless access network. A home agent (HA) 2 of mobile IP and an Authentication Authorization and Accounting (AAA) server 3 for performing user authentication, access authorization, and accounting are connected to a core network 1. Base stations (BSs) 10 (10A, 10B, ... 10N) are connected to the core network 1 via an access gateway AGW 4. Reference numeral 7 denotes a session control apparatus (SRNC: Session Reference Network Controller) and reference numerals 20 (20A, 20B, ...) denote mobile stations (ATs).

The AGW 4 includes an AGW unit 5 for control use which handles control messages (control packets) and an AGW unit 6 for user data forwarding which handles user data (user packets). In the following description, the AGW unit 5 for control use is referred to as a C-AGW (Control plane AGW) and the AGW unit 6 for user data forwarding as a U-AGW (User plane AGW). In the above wireless access network, control packets are forwarded via the C-AGW 5 as indicated by dotted lines, and user packets are forwarded via the U-AGW 6 as indicated by solid lines.

FIG. 4 shows an example of a signaling sequence to be performed, for example, to establish a tunnel for forwarding user data between a BS 10A and the AGW 4 when an AT 20A is connected to the core network 1, in the wireless access network shown in FIG. 3.

When a connection request is issued from the AT 20A, an access authentication procedure is executed between the AAA server 3 and the AT 20A via the BS 10A, SRNC 7, and C-AGW 5 (SQ10a, SQ10b, SQ10c). At this time, the BS 10A is notified from the C-AGW 5 of an IP address of C-AGW 5 as AGW-ID (SQ11), and the C-AGW 5 is notified from the AT 20A of an identifier (ATID) of AT 20A to be authenticated (SQ12).

Upon completion of the access authentication of AT 20A, the BS 10A performs configurations (SQ14a, SQ14b) to establish a wireless connection between the AT 20A and the BS 10A. After that, the BS 10A transmits to the C-AGW 5 a tunnel setup request message to establish a tunnel for forwarding user data. The tunnel setup request includes the identifier (ATID) of AT 20A. In this example, a PMIP RRQ message is transmitted as the tunnel setup request (S015). In the case of a system configuration that allows the AGW 4 to establish a plurality of tunnels for the same AT, the BS 10A adds control information ("Primary") for indicating the first tunnel setup to the PMIP RRQ message.

Upon receiving the PMIP RRQ message, the C-AGW 5 returns a reply message, which is a PMIP RRP message in this example, to the BS 10A (SQ16). The PMIP RRP message includes an IP address of U-AGW 6 as information ("Endpoint") for indicating a termination point of the tunnel. Upon receiving the PMIP RRP message from the C-AGW 5, the BS 10A establishes a tunnel toward the U-AGW 6 specified by the "Endpoint" (SQ18). Thereby, the AT 20A transits into a state capable of communicating user data with a correspondent node connected to the core network 1 through the tunnel established between the BS 10A and the U-AGW 6 (SQ19a, SQ19b, SQ19c).

In the case where the AGW 4 includes a single U-AGW 6 as in the wireless access network shown in FIG. 3, the C-AGW 5 can return a reply message designating the same U-AGW as the Endpoint, in response to every tunnel setup request received from the base stations 10A to 10N. However, in the case where the AGW 4 comprises a C-AGW and a plurality of U-AGWs, when a tunnel setup request is received from one of base stations, the C-AGW 5 has to assign an optimum U-AGW to an AT by taking the load conditions of the U-AGWs into account. 3GPP2 X. S0054-100-0 v1.0 does not disclose about a method of assigning a specific U-AGW to each AT by the AGW 4 provided with a plurality of U-AGWs.

In a broadband mobile communication system such as UMB (Ultra Mobile Broadband), an elaborate handover control adaptable to mobile ATs is required in order to achieve high-speed data transmission with high efficiency. In the UMB communication system, BS switching control is performed so as to connect an AT to one of BSs for which both the statuses of uplink channel and downlink channel are the best, for example, by monitoring the status of uplink radio channel from the AT to each BS and the status of downlink radio channel from the BS to the AT, by the AT 20 and BSs 10.

In this case, there is a possibility that handovers of the same AT occur frequently between BSs for a short period depending on the situation of radio channels, with the result that ineffectual control procedures are executed repeatedly. If the conditions for AT handover between BSs occur frequently, it becomes difficult for BSs and AGW to follow up these handovers because a certain time is required for the tunnel setup between BS and AGW.

SUMMARY OF THE INVENTION

An object of the present invention is to provide a mobile communication system and an access gateway (AGW) enabling assignment of an optimum U-AGW selected from among a plurality of U-AGWs when a tunnel setup request occurs from a base station.

Another object of the present invention is to provide a mobile communication system and an access gateway (AGW) capable of assigning a U-AGW to a base station originating a tunnel setup request so as to distribute loads to a plurality of U-AGWs when a tunnel set up request is received from the base station.

To achieve the above objects, one aspect of the present invention resides in a mobile communication system comprising a plurality of base stations for communicating in wireless with mobile stations and an access gateway (AGW) connected to a core network, wherein tunnels for forwarding data packets are established between each of the base stations and the AGW. The AGW comprises an access gateway unit (C-AGW) for control use to communicate control messages with each of the plurality of base stations via an access network and a plurality of access gateway units (U-AGWs) for data forwarding, each of which communicates data packets with the plurality of base stations via the access network. The C-AGW comprises: a first management table for indicating load status information of each of the U-AGWs in association with an address of each of the U-AGWs; and a controller that retrieves the address of a new U-AGW being in the lowest load status from the first management table when a tunnel setup request message including a mobile station identifier was received from one of the base stations, and returns to the base station a reply message designating the address of the new U-AGW as a tunnel endpoint, wherein, when the tunnel setup request message has been transmitted from a base station to which a mobile station having the mobile station identifier is to be handed over, the controller estimates the load status of the new U-AGW in the case of changing the tunnel endpoint for the mobile station from a current U-AGW to the new U-AGW and designates, as the tunnel endpoint in the reply message, the address of the new U-AGW if the estimated load status satisfies a predetermined condition, but the address of the current U-AGW if the estimated load status does not satisfy the predetermined condition.

For example, in the case where L1 stands for the load of the current U-AGW, L2 the load of the new U-AGW, and ΔL a load occupied by the mobile station questing to establish a tunnel, L1 and L2 are in a relation L1>L2 now, because the new U-AGW is in the lowest load status. When the tunnel endpoint is switched from the current U-AGW to the new U-AGW, the load of the current U-AGW changes from L1 to L1−ΔL and the load of the new U-AGW changes from L2 to L2+ΔL.

Here, L2+ΔL represents the estimated load status of the new U-AGW in the case of switching the tunnel endpoint. If a condition of L1>L2+ΔL is satisfied, a difference between the load of new U-AGW and the load of current U-AGW can be made smaller than the current state by switching the tunnel endpoint from the current U-AGW to the new U-AGW, and a load distribution effect is obtained. However, if L1 is equal to or smaller than L2+ΔL, the switching of the tunnel endpoint from the current U-AGW to the new U-AGW makes the difference between the load of new U-AGW and the load of current U-AGW larger than the current state and the tunnel endpoint switching has an adverse effect on load distribution over the U-AGWs.

More specifically, in another aspect of the present invention, the C-AGW of the access gateway further has a second management table including a plurality of table entries, each of which indicates, in association with a mobile station identifier, an address of one of the base stations and an address of one of the U-AGWs to be endpoints of a tunnel, and when a tunnel setup request message was received from one of the base stations, the controller of the C-AGW searches the second management table for an objective table entry indicating the addresses of the base station and the current U-AGW being the endpoints of an existing tunnel corresponding to the mobile station identifier specified in the tunnel setup request message, so that when the objective table entry is not registered in the second management table, the controller registers a new table entry indicating, in association with the mobile station identifier, the address of the base station and the address of the new U-AGW to the second management table and returns the reply message designating the address of the new U-AGW as the tunnel endpoint to the base station, and when the objective table entry has already been registered in the second management table, the controller determines whether the predetermined condition is satisfied or not based on the estimated load status of the new U-AGW and the load status of the current U-AGW indicated in said first management table.

When the estimated load status of the new U-AGW does not satisfy the predetermined condition, the controller of the C-AGW rewrites the base station address in the objective table entry registered in the second management table to the address of the base station having transmitted the tunnel setup request message.

In the case where the tunnel setup request message requests to establish a second tunnel to be coexistent with a first tunnel being used by the mobile station having the mobile station identifier, the controller of the C-AGW registers to the second management table a new table entry indicating, in association with the mobile station identifier specified in the tunnel setup request message, the address of the base station having transmitted the tunnel setup request message and the address of the U-AGW designated as the tunnel endpoint in the reply message.

In one embodiment of the present invention, the C-AGW of the access gateway further has a third management table including a plurality of table entries, each of which indicates, in association with a mobile station identifier, communication quality information to be ensured to a mobile station having the mobile station identifier, and the controller of the C-AGW searches the third management table for communication quality information corresponding to the mobile station identifier specified in the tunnel setup request message and estimates the load status of the new U-AGW in the case of changing the tunnel endpoint, based on the communication quality information and load status information of the new U-AGW indicated in the first management table.

In one embodiment of the present invention, the controller of the C-AGW collects load status information periodically from each of the plurality of U-AGWs and stores the load status information into the first management table. In another embodiment of the present invention, the controller of the C-AGW updates the load status information of each of the U-AGWs stored in the first management table based on the second and third management tables.

According to the present invention, when a tunnel setup request issued from a base station which is a target base station to hand over a mobile station, the C-AGW selects a new U-AGW being in the lowest load status out of the plurality of U-AGWs, estimates the load status of the new U-AGW in the case of switching the tunnel endpoint for the mobile station from the current U-AGW to the new U-AGW, designates the new U-AGW as the tunnel endpoint for the mobile station if the estimated load status satisfies a predetermined condition, but designates the address of the current U-AGW as the tunnel endpoint if the estimated load status does not satisfy the predetermined condition.

According to the present invention, therefore, since the tunnel endpoint switching is avoided if no load distribution effect is expected by the tunnel endpoint switching and the same U-AGW as the endpoint of the existing tunnel having been established by a source base station of the handover can be notified to the target base station as an endpoint of a new tunnel, it becomes possible to forward communication packets for the mobile station via the same U-AGW continuously even when the base station to be connected in wireless to the mobile station has switched to the target base station.

BRIEF DESCRIPTION OF THE DRAWINGS

FIG. 10 illustrates an embodiment of a U-AGW status table 57 formed in the memory 53 of the C-AGW 5;

FIG. 11 illustrates an embodiment of a QoS information table 58 formed in the memory 53 of the C-AGW 5;

FIG. 12 illustrates an embodiment of a U-AGW address table 59 formed in the memory 53 of the C-AGW 5;

DETAILED DESCRIPTION OF PREFERRED EMBODIMENTS

Preferred embodiments of the present invention will be described hereinafter with reference to the drawings.

Figure 1:
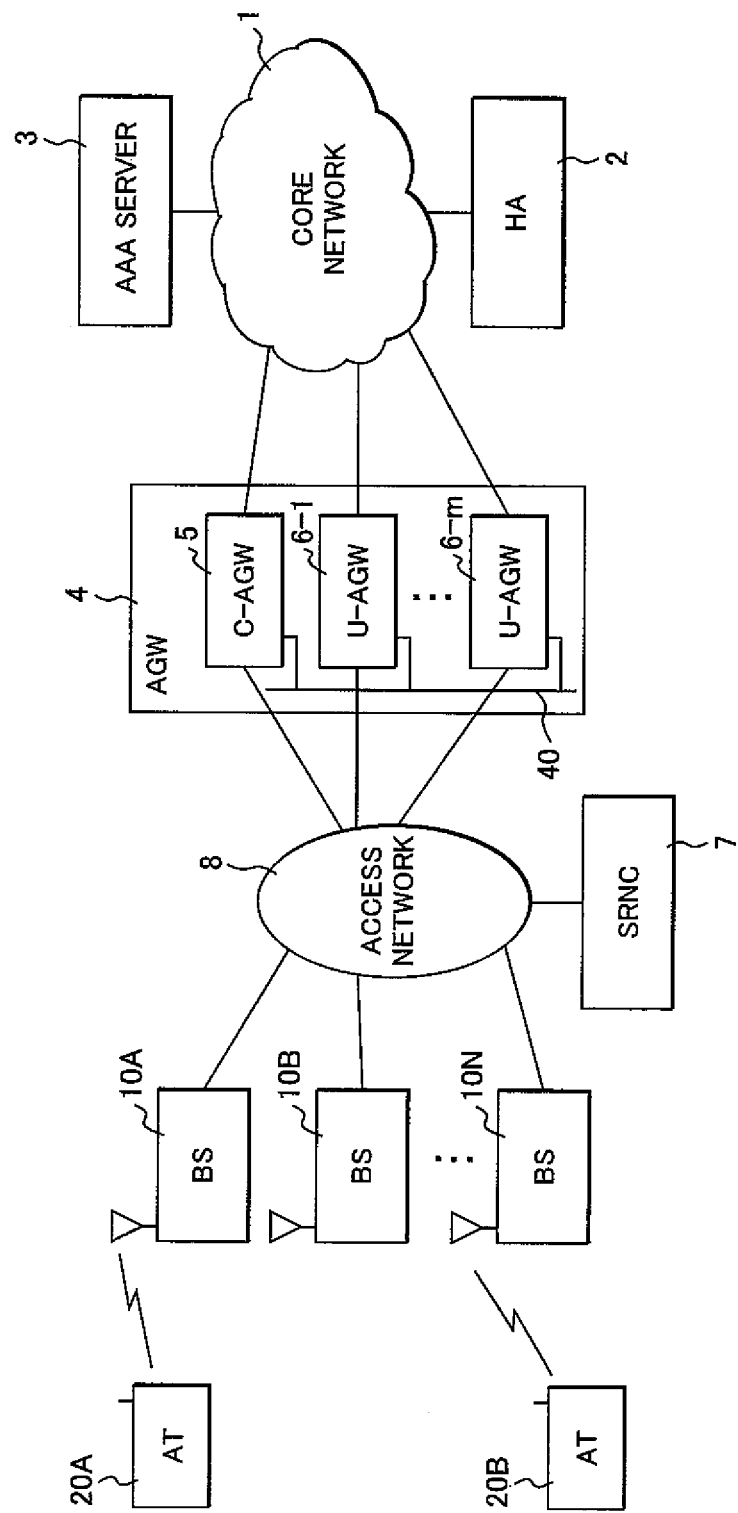
FIG. 1 is a diagram showing an example of a mobile communication system to which the present invention is applied.

FIG. 1 shows an example of a mobile communication system to which the present invention is applied. In the mobile communication system shown here, an AGW 4 equipped with a plurality of U-AGWs 6 (6-1 to 6-m) is located between an access network 8 and a core network 1. The access network 8 accommodates a session control apparatus SRNC (Session Reference Network Controller) 7 and a plurality of base stations 10 (10A, 10B, ... 10N), and the core network 1 includes a Home Agent (HA) 2 and an AAA server 3. In the AGW 4, the plurality of U-AGWs 6 (6-1 to 6-m) are connected to a C-AGW 5 by an AGW internal bus 40.

Figure 2:
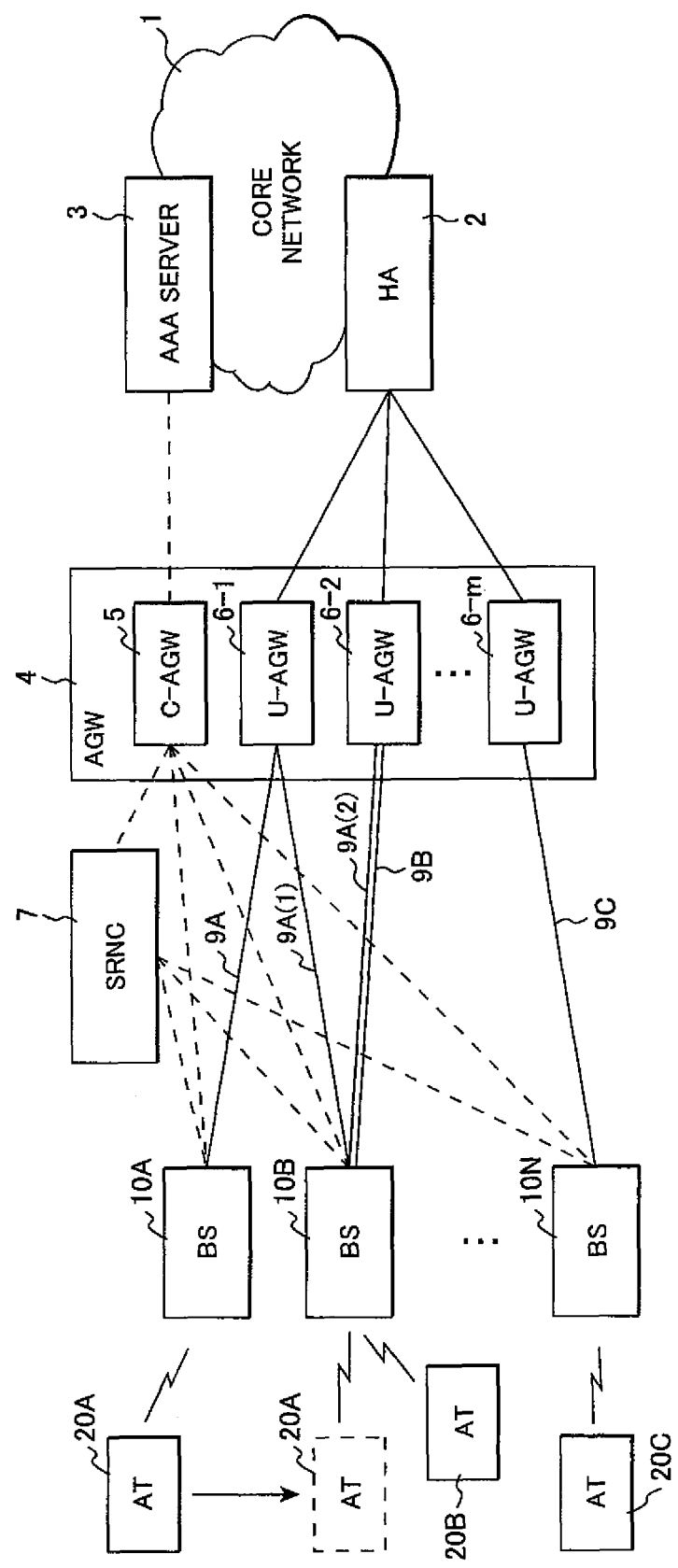
FIG. 2 is a diagram showing logical connection relationships among BSs 10, SRNC 7, AGW 4, HA 2, and AAA server 3 shown in FIG. 1.
Figure 3:
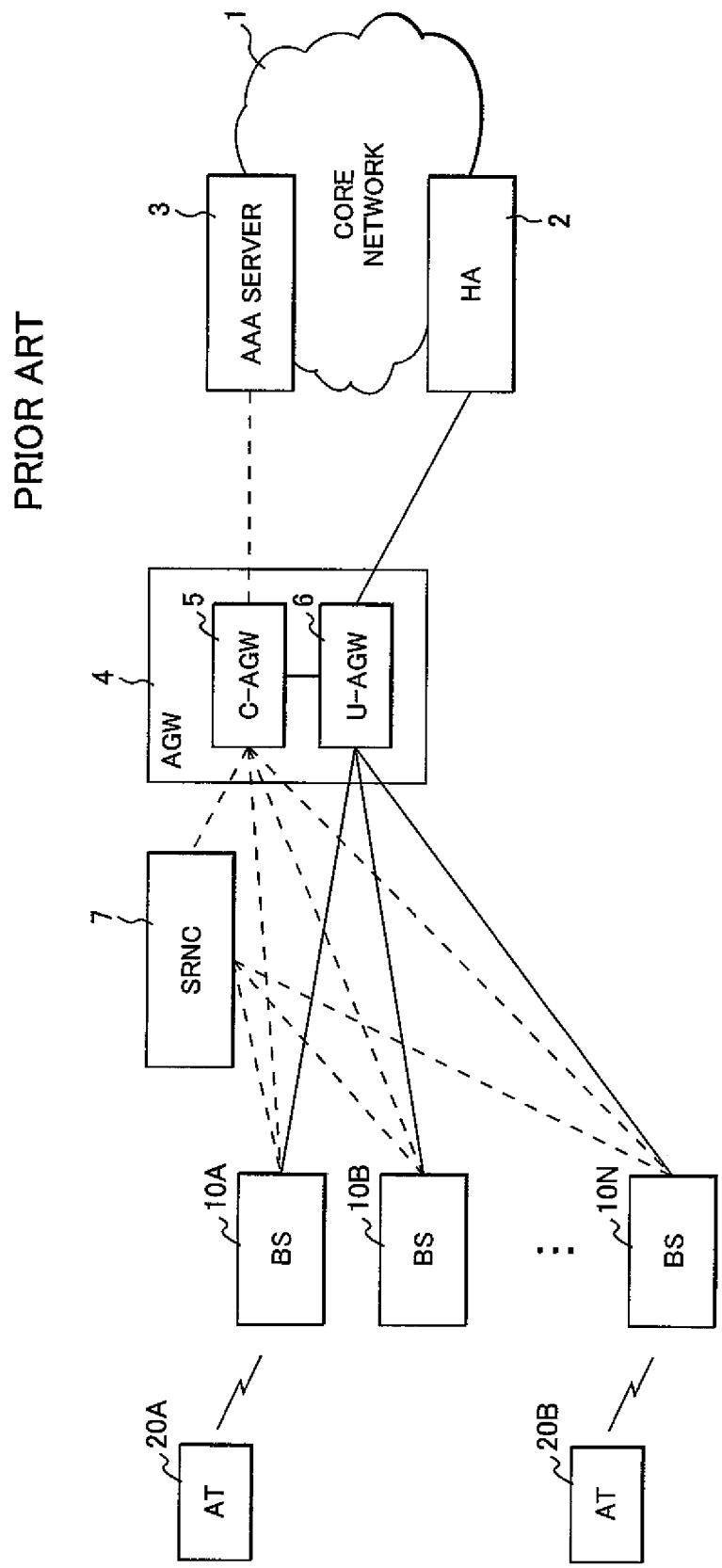
FIG. 3 is a diagram showing an example of a conventional wireless access network.

FIG. 2 shows logical connection relationships among BSs 10, SRNC 7, AGW 4, HA 2, and AAA server 3 shown in FIG. 1. In the mobile communication system of the present invention, control messages (control packets) are handled by the C-AGW 5 as indicated by dotted lines, and user data (user packets) are handled in distributive manner by the plurality of U-AGWs 6-1 to 6-m as indicated by solid lines.

In the present embodiment, the C-AGW 5 is provided with a U-AGW status table for indicating the load status of each U-AGW 6, a QoS information table for storing user QoS profile information in association with the identifier ATID of each mobile station (AT) having been authenticated to have an access right, and a U-AGW address table for storing the addresses of a base station (BS) and a U-AGW to be the endpoints of a tunnel in association with ATID, as will be described later. The QoS information table stores as user QoS profile information, for example, QoS information representing priority, maximum bandwidth, etc. to be assured for each AT and other information such as a maximum CPU occupation rate allowed for each AT.

Upon receiving a tunnel setup request message including an AT identifier (ATID) from one of BSs 10, the C-AGW 5 determines whether a table entry including the ATID exists in the U-AGW address table. If the table entry corresponding to the ATID is not registered yet, the C-AGW 5 determines the load status of each U-AGW by referring to the U-AGW status table, selects the address of an optimum U-AGW to be the tunnel endpoint so that processing load are distributed over the plurality of U-AGWs 6-1 to 6-m, and notifies the U-AGW address to the BS having transmitted the tunnel setup request.

In FIG. 2, user packets to be communicated by an AT 20A are forwarded through a tunnel 9A established between the BS 10A and the U-AGW 6-1. User packets to be communicated by an AT 20B are forwarded through a tunnel 9B established between the BS 10B and the U-AGW 6-2, and user packets to be communicated by an AT 20C are forwarded through a tunnel 9C established between the BS 10N and the U-AGW 6-m.

Now, assume that the AT 20A has moved from a coverage area of BS 10A into a coverage area of BS 10B as indicated by a dotted line box 20A, in a state where a table entry for the AT 20A has been already registered in the U-AGW address table when establishing the tunnel 9A. In the present embodiment, when a tunnel setup request for the AT 20A is received from the BS 10B, the C-AGW 5 searches the U-AGW status table for the address of a U-AGW being in the lowest load status and retrieves the address of U-AGW 6-1 corresponding to the identifier of the AT 20A from the U-AGW address table.

If the address of the U-AGW corresponding to the identifier of the AT 20A has not been registered in the U-AGW address table, the C-AGW 5 notifies the BS 10B of the address of a new U-AGW, which is in the lowest load status and retrieved from the U-AGW status table, as the tunnel endpoint address. When the U-AGW 6-1 was selected as the new U-AGW, for example, a new tunnel 9A(1) is established between the BS 10B and the U-AGW 6-2. If a U-AGW 6-2 was selected as the new U-AGW, a new tunnel 9A(2) is established between the BS 10B and the U-AGW 6-2.

When the U-AGW 6-2 is selected as the new U-AGW, for example, in the state that the address of the U-AGW 6-1 corresponding to the identifier of the AT 20A has been already registered in the U-AGW address table as in the handover of this example, the C-AGW 5 refers to the U-AGW status table and estimates transitions of load statuses of the U-AGWs 6-1 and 6-2 in the case of switching the endpoint of the tunnel for the AT 20A from the current U-AGW 6-1 to the new U-AGW 6-2. The C-AGW 5 notifies the BS 10B of the address of the new U-AGW 6-2 as the tunnel endpoint address only when the load statuses of the new U-AGW 6-2 in the case of switching the endpoint satisfies a predetermined condition. If the estimated load status of the new U-AGW 6-2 does not satisfy the predetermined condition for U-AGW switching, the C-AGW 5 notifies the BS 10B of the address of the current U-AGW 6-1 as the tunnel endpoint address. In this case, the new tunnel 9A(1) for the AT 20A is established between the BS 10B and the U-AGW 6-1 so that forwarding of packets to be communicated by the AT 20A is controlled by the same U-AGW 6-1 as before.

Figure 5:
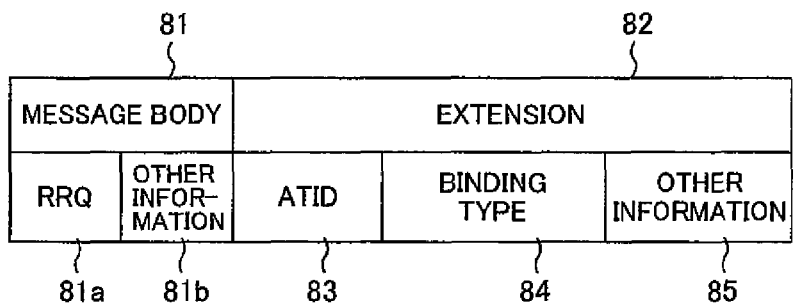
FIG. 5 is a diagram illustrating an example of format of a tunnel setup request message to be transmitted from a BS 10 to a C-AGW 5.

FIG. 5 shows the format of a Registration Request (RRQ) message 80 of Proxy Mobile IP (PMIP) as an example of a tunnel setup request message to be transmitted from each base station (BS) 10 to the C-AGW 5.

The RRQ message 80 comprises a message body 81 and an extension part 82. The message body 81 is a main part other than the extension part of a Registration Request message described in IETF RFC3344, section 3.3, and includes a message type 81a indicating that this message is RRQ and other information 81b including IP addresses, etc. The extension part 82 includes a mobile station identifier (ATID) 83, a binding type 84 indicative of the type of tunnel, and other information 85. The binding type 84 includes information for discriminating whether the tunnel requested to be set up by the RRQ message 80 is the first tunnel ("Primary") for the mobile station specified by ATID 83 or the second or subsequent tunnel ("Reverse Link (RL) Only") to be set up for upward data transmission. The other information 85 includes information such as a service class required by the AT.

Figure 6:
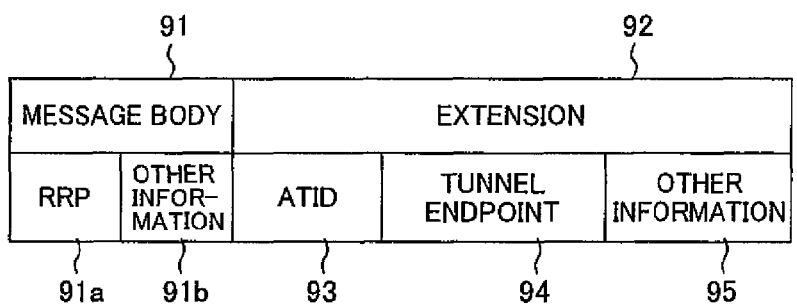
FIG. 6 is a diagram illustrating an example of format of a reply message to be returned from the C-AGW 5 to the BS 10.

FIG. 6 shows the format of a PMIP RRP message 90 to be returned from the C-AGW 5 to the BS 10 as a reply message in response to the RRQ message 80.

The RRP message comprises a message body 91 and an extension part 92. The message body 91 is a main part other than the extension part of a Registration Reply message described in IETF RFC3344, section 3.4, and includes a message type 91a indicating that this message is RRP and other information 91b indicating IP addresses, etc. The extension part 92 includes the mobile station identifier (ATID) 93, a tunnel endpoint 94, and other information 95. In the field of tunnel endpoint 94, the IP address of U-AGW having been selected from among the U-AGWs 6-1 to 6-m by the C-AGW 5 is set.

Figure 7:
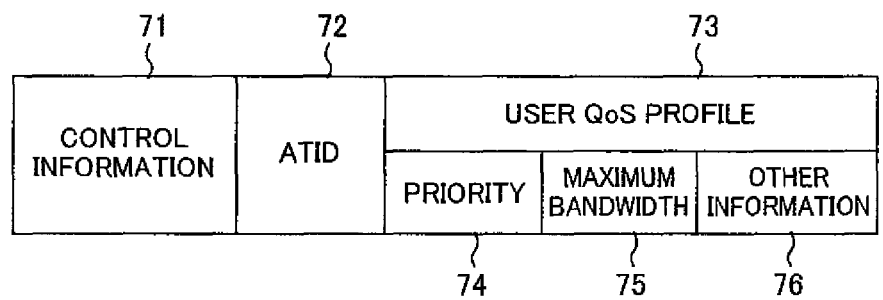
FIG. 7 is a format of a User QoS Profile message 70 to be transmitted from the AAA-server 3 to the C-AGW 5.

FIG. 7 shows the format of a User QoS Profile message 70 to be transmitted from the AAA-server 3 to the C-AGW 5.

The User QoS Profile message comprises a control information part 71, a mobile station identifier (ATID) 72, and a user QoS profile 73 representing a communication service quality (QoS) ensured to the AT identified by the ATID 72. The control information part 71 includes a message type indicating that this message 70 is a user QoS profile message and other information. The user QoS profile 73 includes, for example, priority 74 of communication service, a maximum bandwidth (BW) 75 available for the AT, and other information 76.

Figure 8:
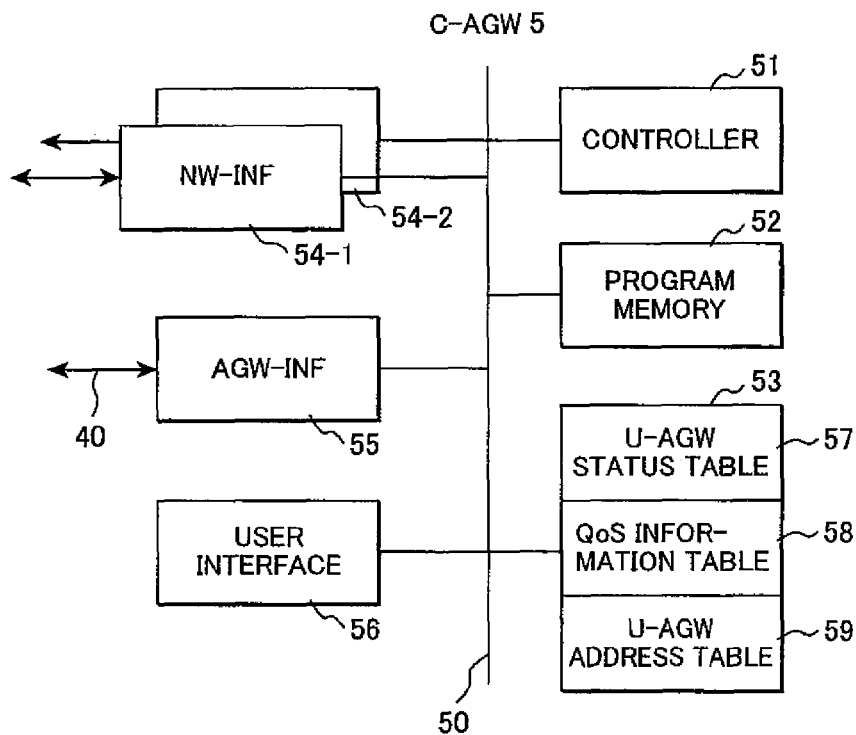
FIG. 8 is a block structural diagram showing an embodiment of the C-AGW 5.

FIG. 8 is a block structural diagram sowing an embodiment of the C-AGW 5. The C-AGW 5 comprises a controller (processor) 51, a program memory 52 for storing protocol processing routines and other control programs to be executed by the controller 51, a data memory 53, a network interface (NW-INF) 54-1 for connecting to the core network 1, a network interface (NW-INF) 54-2 for connecting to the access network 8, an AGW interface (AGW-INF) 55 for connecting to the AGW internal bus 40, a user interface 56, and an internal bus 50 interconnecting the above mentioned components. In the data memory 53, a U-AGW status table 57, a QoS information table 58, a U-AGW address table 59, and other data storage areas are formed.

Figure 9:
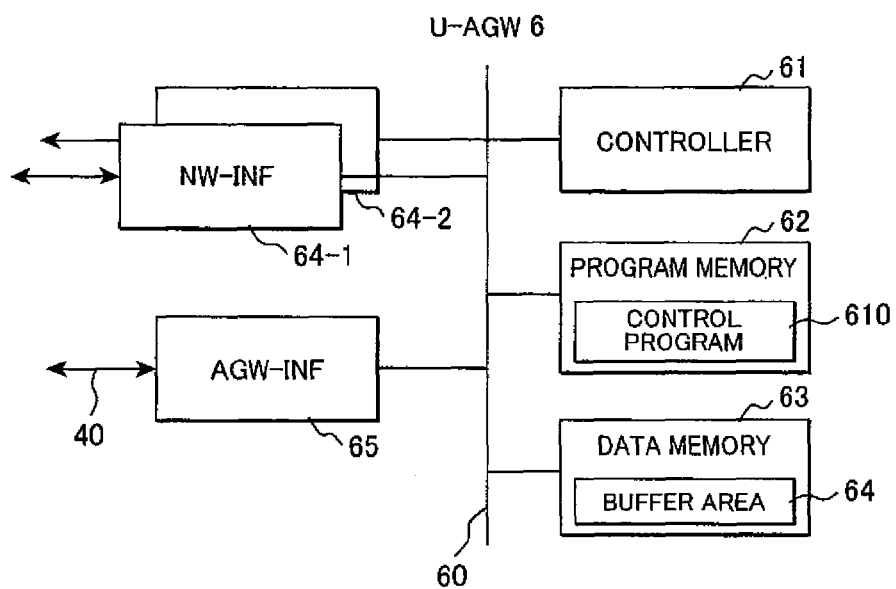
FIG. 9 is a block structural diagram showing an embodiment of a U-AGW 6.

FIG. 9 is a block structural diagram sowing an embodiment of the U-AGW 6. The U-AGW 6 comprises a controller (processor) 61, a program memory 62 for storing various control programs to be executed by the controller 61, a data memory 63, a network interface (NW-INF) 64-1 for connecting to the core network 1, a network interface (NW-INF) 64-2 for connecting to the access network 8, an AGW interface (AGW-INF) 65 for connecting to the AGW internal bus 40, and an internal bus 60 interconnecting the above mentioned components.

In the program memory 62, a control program for measuring the load status of the U-AGW 6 and periodically notifying the C-AGW 5 of the measured load status is stored. In the data memory 63, a buffer area 64 comprising a transmission buffer area for temporarily storing transmission packets and a reception buffer area for temporarily storing received packets is formed. The network interface (NW-INF) 64-2 for connecting to the access network 8 may be connected to the access network 8, together with the NW-INFs 64-2 of the other U-AGWs in the same AGW 4, via a packet switch associated with the AGW 4.

FIG. 10 illustrates an embodiment of the U-AGW status table 57 formed in the memory 53 of the C-AGW 5.

The U-AGW status table 57 comprises a plurality of table entries corresponding to the U-AGWs 6-1 to 6-m connected to the C-AGW 5. Each table entry includes, as U-AGW load status information in association with U-AGW address 571, for example, a use rate of CPU 572, a use rate of buffer 573, and other information 574. The use rate of buffer 573 varies depending on the number of user packets waiting for being processed in the reception buffer area of the U-AGW. The other information 574 includes, for example, a communication bandwidth of U-AGW and a use rate of the bandwidth.

FIG. 11 illustrates an embodiment of the QoS information table 58 formed in the memory 53 of the C-AGW 5.

The QoS information table 58 comprises a plurality of table entries, each of which indicates the relation between the mobile station identifier (ATID) 581 and user QoS profile 582. The user QoS profile 582 indicates, for example, a priority 582A of communication service or resource allocation for a mobile station identified by the ATID 581, a maximum bandwidth (BW) 582B available for the mobile station, a communication service class (Allowed Service Class) 582C, and a maximum CPU occupation rate 582D allowed for the mobile station. As the communication service class, information for specifying a communication service class ensured to the AT user by a contract beforehand, for example, a service class of data communication, voice communication, or video communication is stored.

FIG. 12 illustrates an embodiment of the U-AGW address table 59 formed in the memory 53 of the C-AGW 5.

The U-AGW address table 59 comprises a plurality of table entries, each of which indicates, in association with a mobile station identifier (ATID) 591, a U-AGW address 592, a base station (BS) address 593, and a binding type 594. The U-AGW address 592 and the BS address 593 represent IP addresses of the U-AGW and the base station to be the endpoints of a tunnel for forwarding user packets, respectively. As the binding type 594, "Primary" is stored when the tunnel established between a base station designated by the BS address 593 and a U-AGW designated by the U-AGW address 592 is the only one for the mobile station having the ATID 591 and "RL Only" is stored when the tunnel is the second or subsequent one coexisting with the first tunnel.

In the case where a management apparatus for supervising the session status of each mobile station is located as an entity governing the BS, for example, each base station may decide whether the binding type should be "Primary" or "RL Only" in accordance with control information supplied from the management apparatus.

In FIG. 12, for example, a table entry EN1 indicates that the tunnel (tunnel 9A in FIG. 2) established between the base station 10A having the IP address "IP10A" and the U-AGW 6-1 having the IP address "IP6-1" is the first tunnel for the AT 20A. Likewise, a table entry EN2 indicates that the tunnel (tunnel 9B in FIG. 2) established between the base station 10B having the IP address "IP10B" and the U-AGW 6-2 having the IP address "IP6-2" is the first tunnel for the AT 20B.

Figure 13:
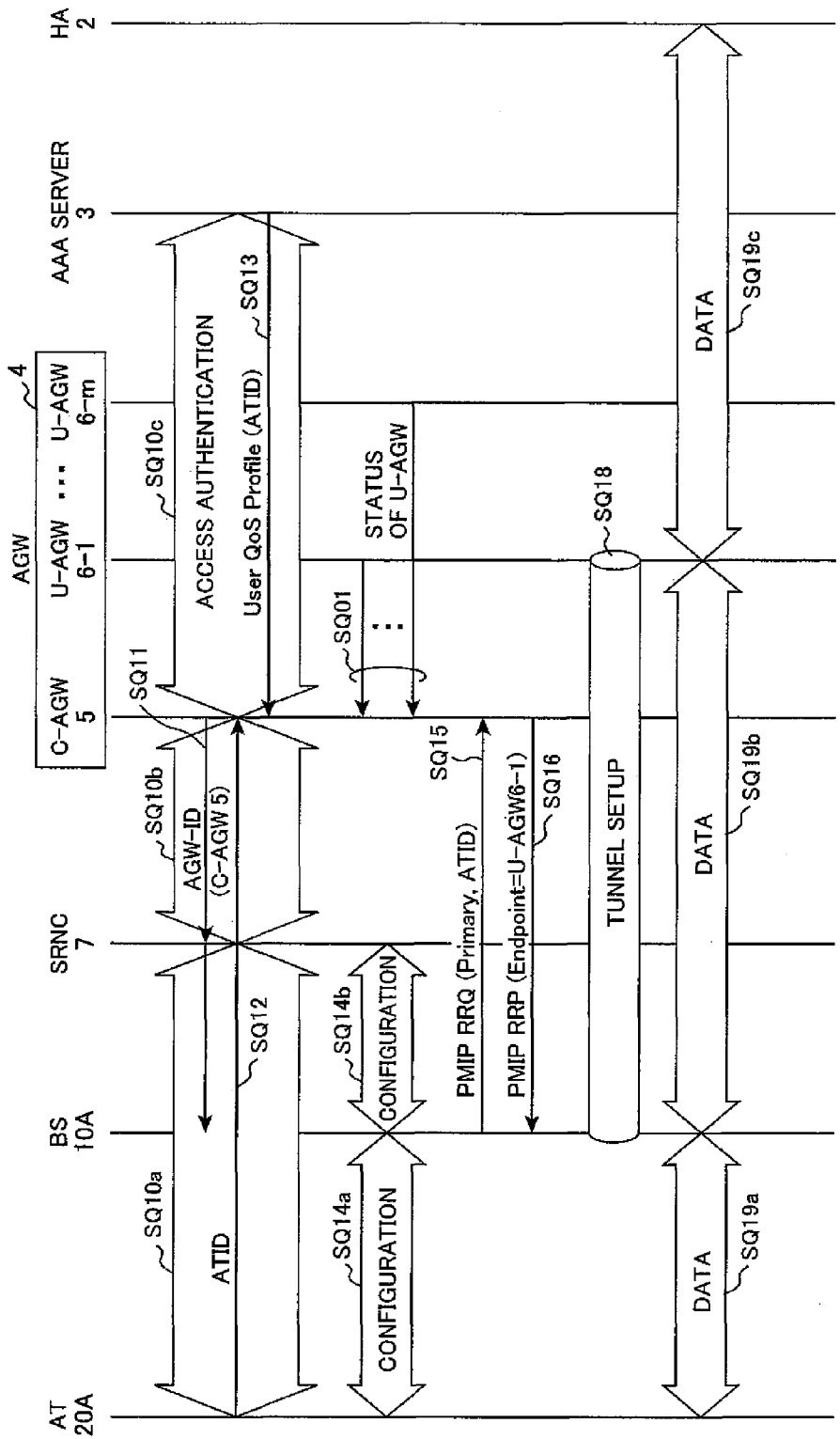
FIG. 13 is a signaling sequence diagram to explain the function of the C-AGW 5 of the present invention.

FIG. 13 illustrates the first embodiment of a signaling sequence for establishing a tunnel for forwarding user data between the base station 10 and one of U-AGWs 6-1 to 6-m in the mobile communication system of the present invention.

Figure 4:
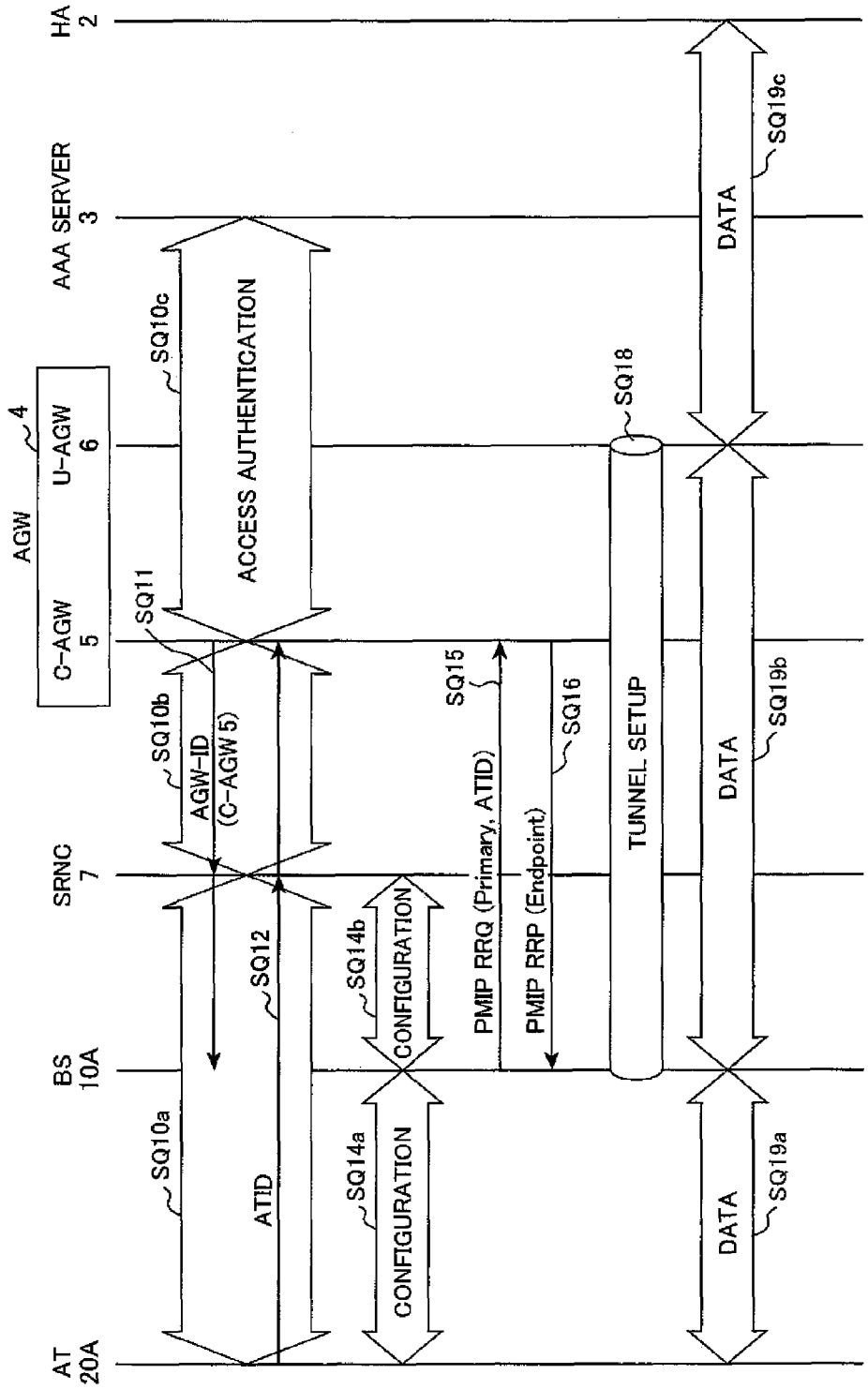
FIG. 4 is a diagram to explain a signaling sequence for establishing a tunnel for forwarding user data in the wireless access network shown in FIG. 3.

Here, a signaling sequence will be explained, similarly to FIG. 4, about the case where the AT 20A is connected to the core network 1, in the wireless access network shown in FIG. 2, but the explanation for the same part as the conventional signaling sequence described with respect to FIG. 4 will be simplified by applying the same reference symbols as used in FIG. 4.

In the present embodiment, each U-AGW 6 (6-1 to 6-m) periodically measures the use rate of CPU, the use rate of buffer, and other resource parameter values indicative of its load status and notifies the C-AGW 5 of the status information indicating the above mentioned values by a U-AGW status notification message (SQ01). Although transmission of the U-AGW status notification message from each U-AGW 6 to the C-AGW 5 is repeated periodically, this transmission is typified by SQ01 in FIG. 13 for simplification. Upon receiving a U-AGW status notification message from one of U-AGWs 6, the C-AGW 5 updates the load status information such as the use rate of CPU 572, use rate of buffer 573, and other information 574 in a table entry corresponding to the source address (the U-AGW address) of the received message in the U-AGW status table 57.

In the access authentication procedure SQ10a to SQ10c for authenticating the mobile station (AT) 20A shown in FIG. 13, when succeeded in the access authentication (including user authentication) of the AT 20A, the AAA server 3 transmits to the C-AGW 5 the user QoS profile including the priority, maximum BW, service class, maximum CPU occupation rate, etc. allowed for the AT 20A as a User QoS profile message (SQ13).

Upon receiving the User QoS profile message from the AAA server 3, the controller 51 of the C-AGW 5 executes a user QoS profile receiving routine, not shown in FIG. 8, and checks whether the AT identifier (ATID) notified from the AT 20A at step SQ12 in FIG. 13 has already been registered as ATID 581 in the QoS information table 58. If the ATID of the AT 20A is not registered yet in the QoS information table 58, the controller 51 adds a new table entry indicating the correspondence of the ATID to the user QoS profile notified from the AAA server 3 into the QoS information table 58. When the ATID of the AT 20A has already been registered as ATID 581 in the QoS information table 58, the controller 51 terminates the user QoS profile receiving routine without updating the QoS information table 58.

Upon completion of the access authentication of the AT user, the BS 10A performs configurations (SQ14a, SQ14b) for connecting with the AT 20A through a wireless channel. After that, the BS 10A transmits to the C-AGW 5 a tunnel setup request (PMIP RRQ) message 80 to establish a tunnel for forwarding user data (SQ15). The request message includes the identifier (ATID) 83 of the AT 20A and the binding type 84 as shown in FIG. 5.

Upon receiving the tunnel setup request (PMIP RRQ) message 80, the controller 51 of the C-AGW 5 refers to the U-AGW status table 57 to select a U-AGW being in the lowest load status among the U-AGWs 6-1 to 6-m as the U-AGW to be assigned to the AT 20A. In this example, U-AGW 6-11s selected as the U-AGW to be assigned to the AT 20A. Then, the controller 51 returns to the BS 10A a response (PMIP RRP) message 90 shown in FIG. 6 which includes the IP address of the U-AGW 6-1 as the tunnel endpoint 94 (SQ16). At this time, the controller 51 updates the U-AGW address table 59 in the memory 53 by adding a new table entry that indicates, in association with the ATID 93 specified in the PMIP RRQ message, the IP address of the U-AGW 6-1 to be the tunnel endpoint, the IP address of the base station having transmitted the PMIP RRQ message, and the binding type 84 indicated in the PMIP RRQ message 80.

Figure 14:
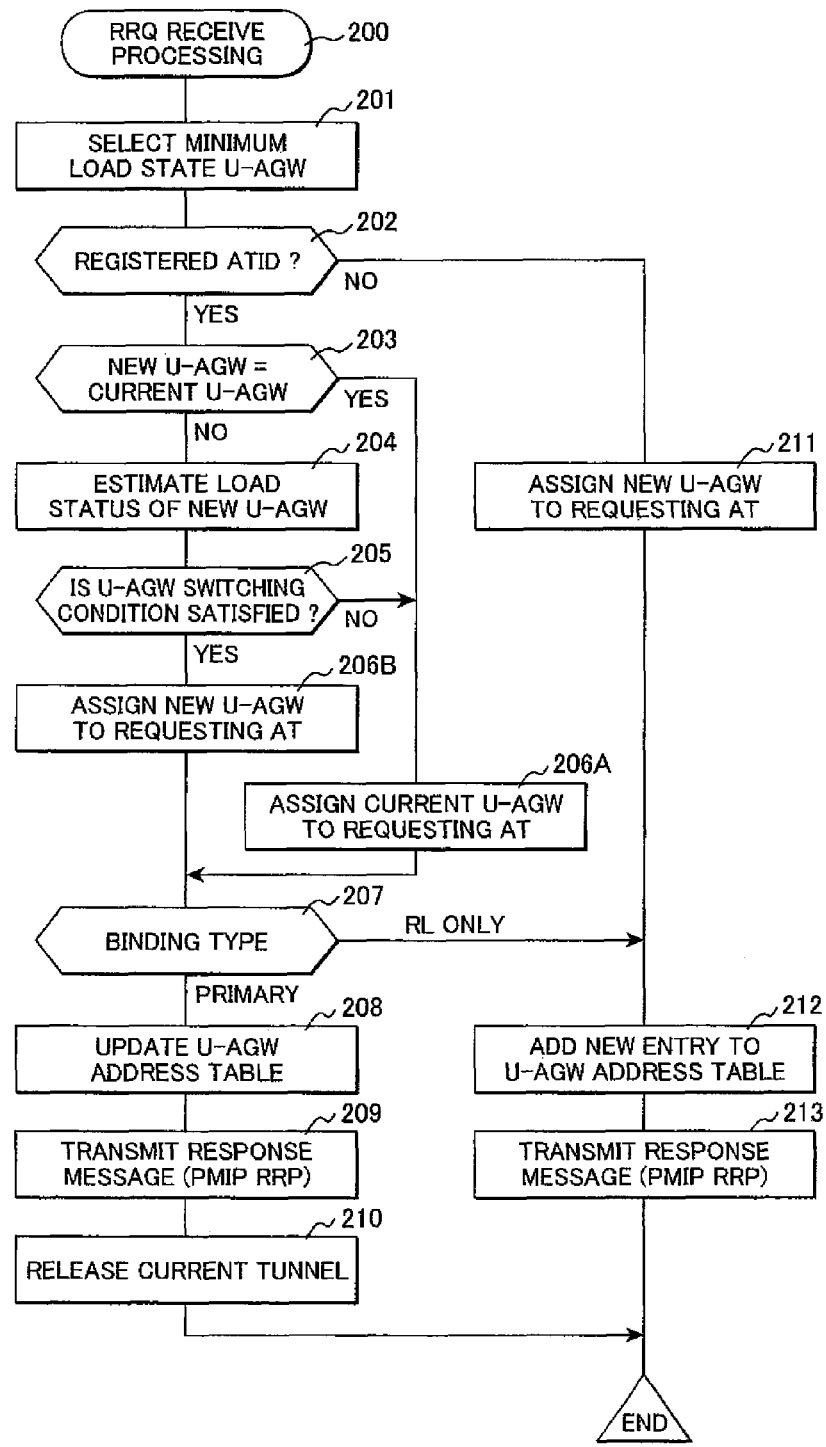
FIG. 14 is a flowchart showing an embodiment of RRQ receive processing routine 200 to be executed by the controller 51 of the C-AGW 5.

FIG. 14 illustrates an RRQ receive processing routine 200 to be executed by the controller 51 in response to receiving the tunnel setup request (PMIP RRQ) message.

In the RRQ receive processing routine 200, the controller 51 selects a U-AGW (address) being now in the lowest load status, based on the use rate of CPU 572, use rate of buffer 573, and other information 574 indicated in the U-AGW status table 57 (step 201). It is assumed here that U-AGW 6-1 was selected as the U-AGW being in the lowest load status.

The controller 51 then checks whether the requesting ATID 83 specified in the received PMIP RRQ message 80 has already been registered as the ATID 591 in the U-AGW address table 59 (step 202). It is assumed here that the requesting ATID 83 is not yet registered in the U-AGW address table 59 and the PMIP RRQ message 80 has been transmitted from the base station 10A to the C-AGW 5. In this case, the controller 51 assigns a new U-AGW (U-AGW 6-1 in this example) selected at step 201 to the AT 20A (211) and adds to the U-AGW address table 59 a new table entry EN-1 indicating the correspondence among the ATID 83 of the requesting AT and the binding type 84 specified in the PMIP RRQ message 80, the IP address of the U-AGW 6-1, and the IP address of the base station having transmitted the PMIP RRQ message 80 (212). After that, the controller 51 returns a reply (PMIP RRP) message 90 including the IP address ("IP6-1") of the U-AGW 6-1 as the tunnel endpoint 94 to the base station 10A having transmitted the PMIP RRQ message 90 (213, SQ16 in FIG. 13) and terminates the RRQ receive processing routine 200.

In the case where the requesting ATID specified in the PMIP RRQ message 90 has already been registered as ATID 591 in the U-AGW address table 59, as in the case of AT handover between base stations which will be described later, that is, when the PMIP RRQ message 80 was transmitted from the base station 10B to which the AT 20A is going to be handed over, the controller 51 compares the address of new U-AGW selected at step 201 and the address of current U-AGW registered in association with the requesting ATID in the U-AGW address table 59 (203). If the address of the new U-AGW matches with the address of the current U-AGW, the controller 51 assigns the address of the current U-AGW indicated in the U-AGW address table to the AT 20A (206A).

If the address of the new U-AGW does not match with the address of the current U-AGW, for example, in the case where the current U-AGW is U-AGW 6-1 and the new U-AGW is U-AGW 6-2, the controller 51 estimates the load status of the new U-AGW 6-2 in the case of switching the endpoint of tunnel from the current U-AGW 6-1 to the new U-AGW 6-2, based on the current load status information of the new U-AGW 6-2 indicated in the U-AGW status table 57 and the user QoS profile information of the requesting AT 20A indicated in the QoS information table 58 (204). After that, the controller 51 determines whether the predetermined condition for U-AGW switching is satisfied or not by comparing the estimated load status of the new U-AGW 6-2 and the load status of the current U-AGW 6-1 (205).

For example, in the case where L1 stands for the load of the current U-AGW 6-1 indicated in the U-AGW status table 57, L2 the load of the new U-AGW 6-2 and ΔL a load occupied by the requesting AT, L1 and L2 are in a relation L1>L2 now because the new U-AGW 6-2 is in the lowest load status. When the endpoint of the tunnel for the requesting AT is switched from the current U-AGW 6-1 to the new U-AGW 6-2, the load of the current U-AGW 6-1 changes from L1 to L1−ΔL and the load of the new U-AGW 6-2 changes from L2 to L2+ΔL.

Here, if L1 is larger than L2+ΔL, the difference between the load of U-AGW 6-1 and the load of U-AGW 6-2 can be made smaller than the current state by switching the tunnel endpoint from the current U-AGW 6-1 to the new U-AGW 6-2 and a load distribution effect is obtained. However, if L1 is smaller than L2+ΔL, the switching of the tunnel endpoint from the current U-AGW 6-1 to the new U-AGW 6-2 makes the difference between the load L1−ΔL of the current U-AGW 6-1 and the load L2+ΔL of the new U-AGW 6-2 larger than the current state. In this case, the tunnel endpoint switching has an adverse effect on load distribution.

The U-AGW switching condition at step 205 means a conditional expression for determining whether the tunnel endpoint switching contributes to load distribution, based on the load state of the current U-AGW 6-1 and the estimated load state of the new U-AGW 6-2 in the case of switching the tunnel endpoint. When the new U-AGW 6-2 is in the lowest load status, the relation L1≧L2 is satisfied inevitably. In this case, the tunnel endpoint switching contributes to load distribution if the loads L1, L2 and ΔL are in a relation L1−L2>ΔL.

The controller 51 assigns the address of the current U-AGW indicated in the U-AGW address table 59 to AT 20A when the U-AGW switching condition is not satisfied (206A), and assigns the address of the new U-AGW selected at step 201 to the AT 20A only in the case where the U-AGW switching condition is satisfied (206B). After assigning the U-AGW address to the AT 20A, the controller 51 determines the binding type 84 specified in the PMIP RRQ message 80 (207).

When the biding type indicates "RL Only", that is, in the case where the mobile communication system shown in FIG. 1 has a system configuration that allows establishing a plurality of tunnels for the same AT, the controller 51 adds a new table entry EN-1 to the U-AGW address table 59 (212). The new table entry EN-1 indicates the correspondence among the ATID 83 of requesting AT and the binding type 84 specified in the PMIP RRQ message 80, the IP address of the current U-AGW 6-1, and the source IP address of the PMIP RRQ message 80 indicating the BS 10A (212). After that, the controller 51 returns a reply (PMIP RRP) message specifying the IP address of the U-AGW assigned at step 206A or 206B as the tunnel endpoint 94, to the base station 10B having transmitted the PMIP RRQ message and terminates the routine 200.

When the binding type in the PMIP RRQ message 80 indicates "Primary", the controller 51 rewrites the BS address 593 of the table entry registered in the U-AGW address table 59 to the address of the base station 10B having transmitted the PMIP RRQ message (208). After that, the controller 51 returns a reply (PMIP RRP) message specifying the IP address of the U-AGW assigned at step 206A or 206B as the tunnel endpoint 94, to the base station 10B having transmitted the PMIP RRQ message (209), releases the existing tunnel having been used before the handover (210), and terminates the routine 200.

Returning to FIG. 13, when the PMIP RRP message 90 is received from the C-AGW 5, the BS 10A establishes a tunnel toward the U-AGW 6-1 according to the IP address "IP6-1" of U-AGW specified by the "Endpoint" 94 in the received message (SQ18), whereby the AT 20A becomes in the state capable of communicating user data with the correspondent node via the BS 10A and the U-AGW 6-1 (SQ19a, SQ19b, SQ19c).

Figure 15:
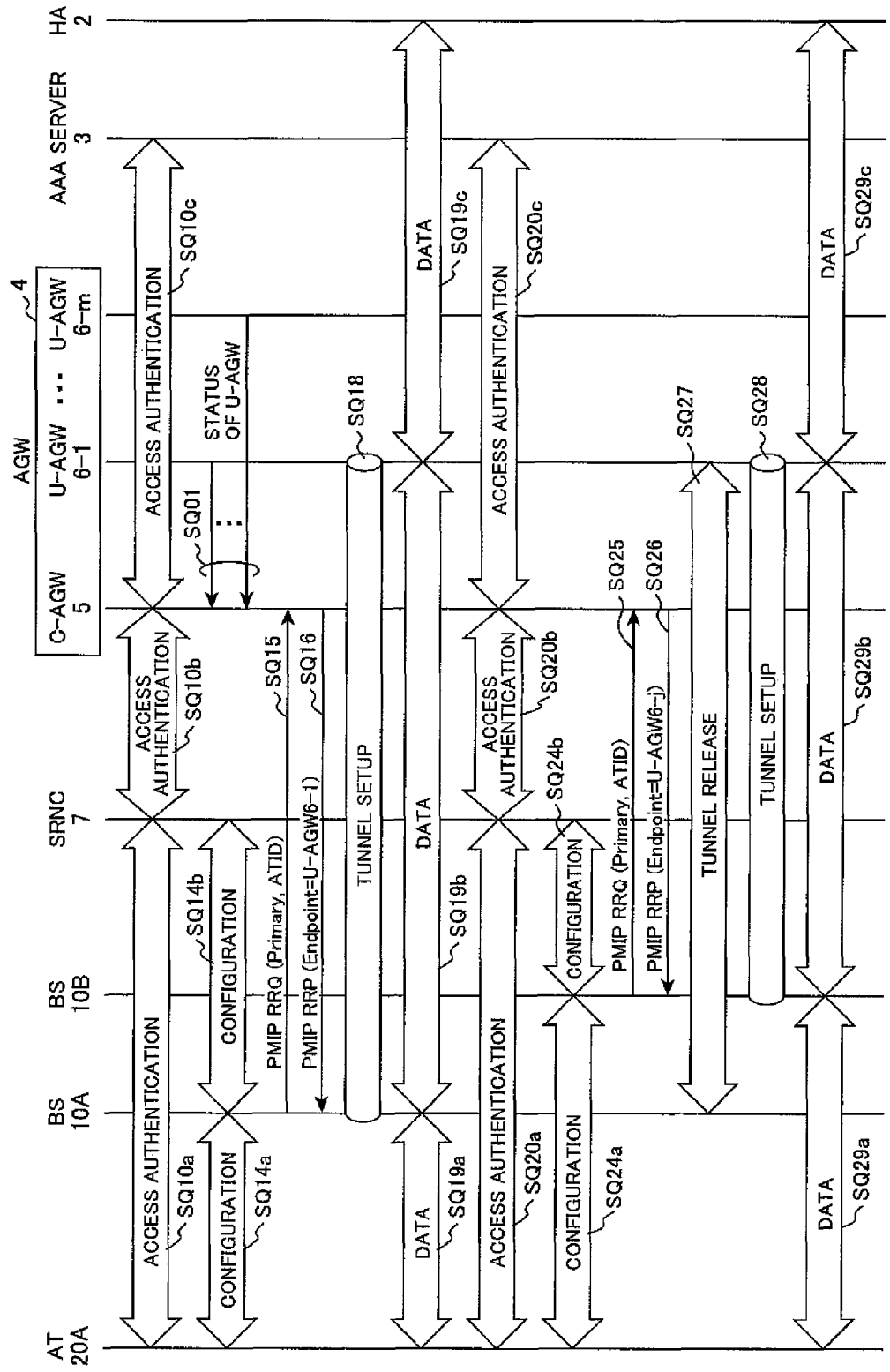
FIG. 15 is a signaling sequence diagram to explain another function of the C-AGW 5 of the present invention.

Next, a description will be made by referring to FIG. 15 about a signaling sequence of an AT handover to be performed when the AT 20A has moved from the coverage area of BS 10A into the coverage area of BS 10B shown in FIG. 2. In FIG. 15, as the sequences SQ10a to SQ19c are the same as those in FIG. 13, their description will be omitted.

Assume here that the AT 20A being in the state of communication through the tunnel established between the base station 10A and the U-AGW 6-1 has moved into the coverage area (service area) of the BS 10B. The AT 20A monitors the status of radio channel for each base station periodically, for example, by measuring the quality of pilot signals received from the base stations 10A and 10B or by communicating control information with each base station.

When the status of the radio channel of the new base station 10B has become better than that of base station 10A, the AT 20A starts a procedure to handover the AT 20A from the base station 10A to the base station 10B. The handover of AT 20A, however, may be initiated by the base station 10A or 10B.

Upon receiving a handover request from the AT 20A, the base station 10B performs the access authentication procedure of AT 20A, with the AAA server 3 via the SRNC 7 and the C-AGW 5 (SQ20a, SQ20b, SQ20c). In this case, similarly to the first access authentication procedure (SQ10a, SQ10b, SQ10c) detailed in FIG. 13, the IP address of C-AGW 5 to which the base station 10B is linked is notified from the C-AGW 5 to the base station 10B, the identifier (ATID) of the AT 20A is notified from the AT 20A to the C-AGW 5, and the user QoS profile corresponding to the ATID is notified from the AAA server 3 to the C-AGW 5.

Upon receiving the user QoS profile from the AAA server 3, the controller 51 of the C-AGW 5 executes the user QoS profile receive processing routine. This time, as the table entry corresponding to the ATID of the AT 20A has already been registered in the QoS information table 58, update of QoS information table 58 is not carried out.

Upon completing the access authentication procedure (SQ20a, SQ20b, SQ20c), the base station 10B performs configurations (SQ24a, SQ24b) for communicate with the AT 20A through a wireless channel, and transmits a tunnel setup request (PMIP RRQ) message 80 to the C-AGW 5 (SQ25). The PMIP RRQ message 80 transmitted from the base station 10B to the C-AGW 5 includes the identifier (ATID) of the AT 20A and "Primary" as its binding type.

Upon receiving the PMIP RRQ message 80 from the base station 10B, the controller 51 of the C-AGW 5 selects a U-AGW to be assigned to the AT 20A by executing the RRQ receive processing routine 200 described by referring to FIG. 14. This time, as the table entry EN1 corresponding to the identifier (ATID) of the AT 20A has already been registered in the U-AGW address table 59, the controller 51 assigns U-AGW 6-*j* (current U-AGW or new U-AGW) to the requesting AT 20A according to steps 203 to 206A or 206B and updates the U-AGW address table 59. After that, the controller 51 returns to the base station 10B a reply (PMIP RRP) message 90 specifying the IP address of the U-AGW 6-*j* by the "Endpoint" 94 (step 209, SQ26 in FIG. 15).

After transmitting the PMIP RRP message 90, the controller 51 releases the existing tunnel 9A between the base station 10A and the U-AGW 6-1, for example, by transmitting a tunnel release message to the base station 10A (step 210, SQ27 in FIG. 15). The tunnel may be released by instructing the U-AGW 6-1 to release the tunnel from the controller 51 through the AGW internal bus and by transmitting a tunnel release message from the U-AGW 6-1 to the base station 10A. The existing tunnel is released, for example, by timer control when a predetermined time passed after the PMIP RRP message was transmitted.

Upon receiving the reply (PMIP RRP) message 90 from the C-AGW 5, the base station 10B establishes a tunnel toward the U-AGW 6-*j* (e.g., U-AGW 6-1 in this example) specified by the "Endpoint" (SQ28), whereby the AT 20A becomes in the state capable of communicating user data via the base station 10B and U-AGW 6-*j* (SQ29*a*, SQ29*b*, SQ29*c*).

According to the present embodiment, when a handover of AT 20A occurs, the C-AGW 5 selects a new U-AGW being now in the lowest load status, but assigns the same U-AGW 6-1 as used before the handover to the tunnel endpoint after the handover of the AT 20A unless the load of the new U-AGW estimated in the case of switching the tunnel endpoint satisfies the predetermined condition of U-AGW switching. It is possible, therefore, to realize inter-base station handover of AT without requiring route change between the AGW 4 and the core network. Further, by switching the tunnel endpoint to the new U-AGW when the estimated load of the new U-AGW satisfies the condition of U-AGW switching, the difference between the load of the new-AGW and the load of the current U-AGW can be decreased than the current state. It is possible, therefore, to optimize the load distribution over the U-AGWs each time the tunnel endpoint switching occurs.

In the embodiment of FIG. 15, when the AT 20A has moved from the coverage area of the base station (BS) 10A into the coverage area of the base station (BS) 10B, a new tunnel (tunnel 9A(1) or 9A(2) in FIG. 2) is established between the base station 10B and the U-AGW 6-*j* and the existing tunnel (tunnel 9A in FIG. 2) having been established between the base station 10A and the U-AGW 6-1 is released. On the other hand, according to the RRQ receive processing routine 200 illustrated in FIG. 14, when the binding type 84 indicates "RL Only" in the tunnel setup request (PMIP RRQ) message 80, a new tunnel can be established between the base station 10B and the U-AGW 6-*j*, while the existing tunnel between the base station 10A and the U-AGW 6-1 remains.

In the above described embodiment, a tunnel (reverse link: "RL Only") for upward transmission is established as a new tunnel 9A(1) or 9A(2) for the AT 20A in the state where the first tunnel (reverse link/forward link: "Primary") 9A for bidirectional transmission has been established. Such a tunnel setup function is provided in the above-mentioned UMB (Ultra Mobile Broadband) wireless system.

If the AT handover is controlled so as to promptly hand over the AT 20A from the base station 10A to the base station 10B when the AT 20A has entered the coverage area of the BS 10B, a reverse handover from the base station 10B to the base station 10A would occur when the AT 20A has returned to the coverage area of the BS 10A. Since establishing a tunnel between base station and U-AGW 6 needs a certain period of time, the load of the C-AGW 5 increases with frequent handovers between base stations. However, by establishing tunnels (9A and 9A(1) or 9A(2)) in parallel toward the AGW 4 from two base stations (BS 10A and BS 10B in FIG. 15) having a high possibility of AT handover between them, it becomes possible to prevent the load of the C-AGW 5 from increasing due to inter-base station handovers, even when the AT 20A wanders across the boundary between the coverage areas of the base stations 10A and 10B.

In the present embodiment, when a new tunnel 9A(1) or 9A(2) for the AT 20 A is established via the base station 10B in a state where the tunnel 9A for the AT 20A via the base station 10A exists already, the controller 51 of the C-AGW 5 selects a new U-AGW being now in the lowest load status and estimates the load of the new U-AGW in the case of changing the tunnel endpoint in order to designate, as the endpoint of the new tunnel, the address of U-AGW acting as the endpoint of the exiting tunnel, unless the estimated load satisfies a predetermined condition. The present embodiment, therefore, has an advantage that the forwarding of data packets for the AT 20A can be continuously controlled by the same U-AGW within the AGW 4 even if the AT 20A moves.

In the determination step of the U-AGW switching condition, for example, use rate of buffer 573 may be used as values of L1 and L2 instead of use rate of CPU 572 indicated in the U-AGW status table 57 in FIG. 10. In this case, a value ΔL of use rate of buffer to be occupied by the AT 20A may be estimated from the user QoS profile of AT 20A in the QoS information table 58, for example, from the value of maximum BW or the service class. As values of L1 and L2, use rate of bandwidth is also usable. In this case, the load status of two U-AGWs after tunnel endpoint switching can be estimated by applying the value of maximum BW indicated by the user QoS profile to ΔL and the values of use rate of bandwidth included as the other information in the U-AGW status table 57 to L1 and L2.

The controller 51 may calculate estimation values of consumed communication resources for each of the U-AGWs provided in the AGW 4, store the estimation values into the U-AGW status table 57, and select one of the U-AGWs whose consumed resources are the smallest as a new U-AGW. The consumed resources for each U-AGW can be obtained from the U-AGW address table 59 and the QoS information table 58. For example, in the case where a total amount of maximum bandwidths ensured to ATs is adopted as the amount of consumed resources, the controller 51 may read out plural pairs of ATID 591 and U-AGW address 592 from the U-AGW address table 59 one after another, retrieve the value of maximum BW 582B corresponding to the ATID 591 from the QoS information table 58, and accumulate the retrieved maximum BW value in the U-AGW status table 57 as the amount of consumed resources corresponding to the U-AGW address 592. In this case, the controller 51 may estimate the load L+ΔL of a new U-AGW in the case of switching the tunnel endpoint, by applying the maximum BW value of the AT to be handed over to ΔL and determine whether the U-AGW switching condition is satisfied or not based on the value of ΔL and the amount of consumed resources L of the current U-AGW.

The controller 51 may count the number of ATs having the highest priority 582A for each U-AGW (IP address) and select a new U-AGW by applying the number of ATs having the highest priority to the amount of consumed resources. Further, the controller 51 may select a new U-AGW being in the lowest load status, by taking account of both of the load status information shown in FIG. 10 notified from each U-AGW and the amount of communication resources for each U-AGW obtained from the above-mentioned U-AGW address table 59 and QoS information table 58.

When a tunnel setup request for a VoIP tunnel is received by the AGW 4 in the case where some of the plurality of U-AGWs composing the AGW 4 are especially optimized, for example, to forward VoIP data packets, the controller 51 may identify the service class 582C indicated in user QoS profile and select a new U-AGW having the smallest estimated amount of consumed resources from a group of VoIP optimized U-AGWs. Here, the VoIP optimization is realized by optimizing hardware or software of the U-AGW. Optimizing hardware includes, for example, increasing the capacity of data memory 63, speeding up the controller (processor) 61, speeding up the network INF 64, and so on. Optimizing software includes, for example, specializing the software to be stored in the program memory 62, addition of new functions according to service types, and so on.

Figure 16:
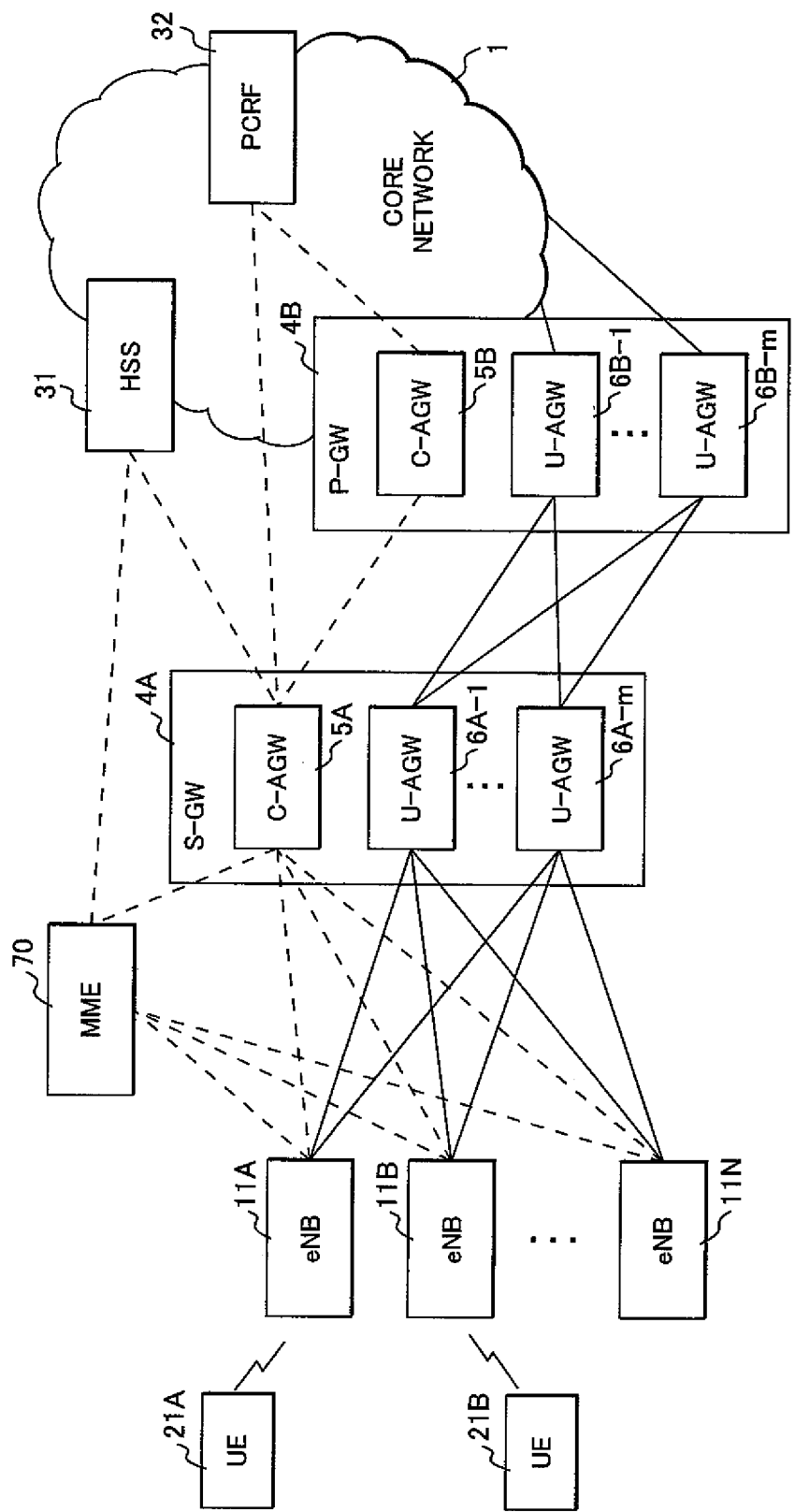
FIG. 16 is a diagram showing a second embodiment of a mobile communication system to which the present invention is applied.

FIG. 16 shows, as another embodiment of the present invention, an example of application of the invention to a mobile communication system complying with 3GPP (3rd Generation Partnership Project) LTE (Long Term Evolution), which is a new communication standard for mobile phones under study in the 3GPP standardization organization.

In the LTE wireless communication system, each mobile station 21 (21A, 21B, ...) is called a User Equipment (UE), each base station 11 (11A, 11B, 11C, ...) is called E-UTRAN Node B (eNB), and a session control apparatus 70 is called a Mobility Management Entity (MME).

In FIG. 16, each eNB 11 is connected to a Serving Gateway (S-GW) 4A and the MME 70 belonging to an access network. The S-GW 4A is an access gateway (AGW) provided with a function of packet forwarding and routing control. The S-GW 4A is connected to the MME 70 belonging to the access network, and connected to a Public Data Network Gateway (P-GW) 4B, a Home Subscriber Server (HSS) 31, and a Policy and Charging Rules Function (PCRF) 32, each of which belongs to the core network 1. The HSS 31 is a node for storing subscriber information and the PCRF 32 is a node for performing a user authentication and accounting processing.

The S-GW 4A comprises a C-AGW 5A for handling control messages and a plurality of U-AGWs 6A-1 to 6A-n for forwarding user data. Like the C-AGW 5 in the first embodiment, the C-AGW 5A is provided with the U-AGW status table 57, QoS information table 58, and U-AGW address table 59. When UE handover occurs, the C-AGW 5A changes the U-AGW to be a tunnel endpoint from a current U-AGW to a new U-AGW being in the lowest load status only when a predetermined U-AGW switching condition is satisfied.

The P-GW 4B is a gateway provided with an accounting function of charging depending on a service level and a function of assigning an IP address to each UE 21. The P-GW 4B comprises a C-AGW 5B for handling control messages and a plurality of U-AGWs 6B-1 to 6B-n for forwarding user data. Like the C-AGW 5 in the first embodiment, the C-AGW 5B is also provided with the U-AGW status table 57, QoS information table 58, and U-AGW address table 59. When UE handover occurs, the C-AGW 5B changes the U-AGW to be a tunnel endpoint to a new U-AGW being in the lowest load status only when the U-AGW switching condition is satisfied.

Figure 17:
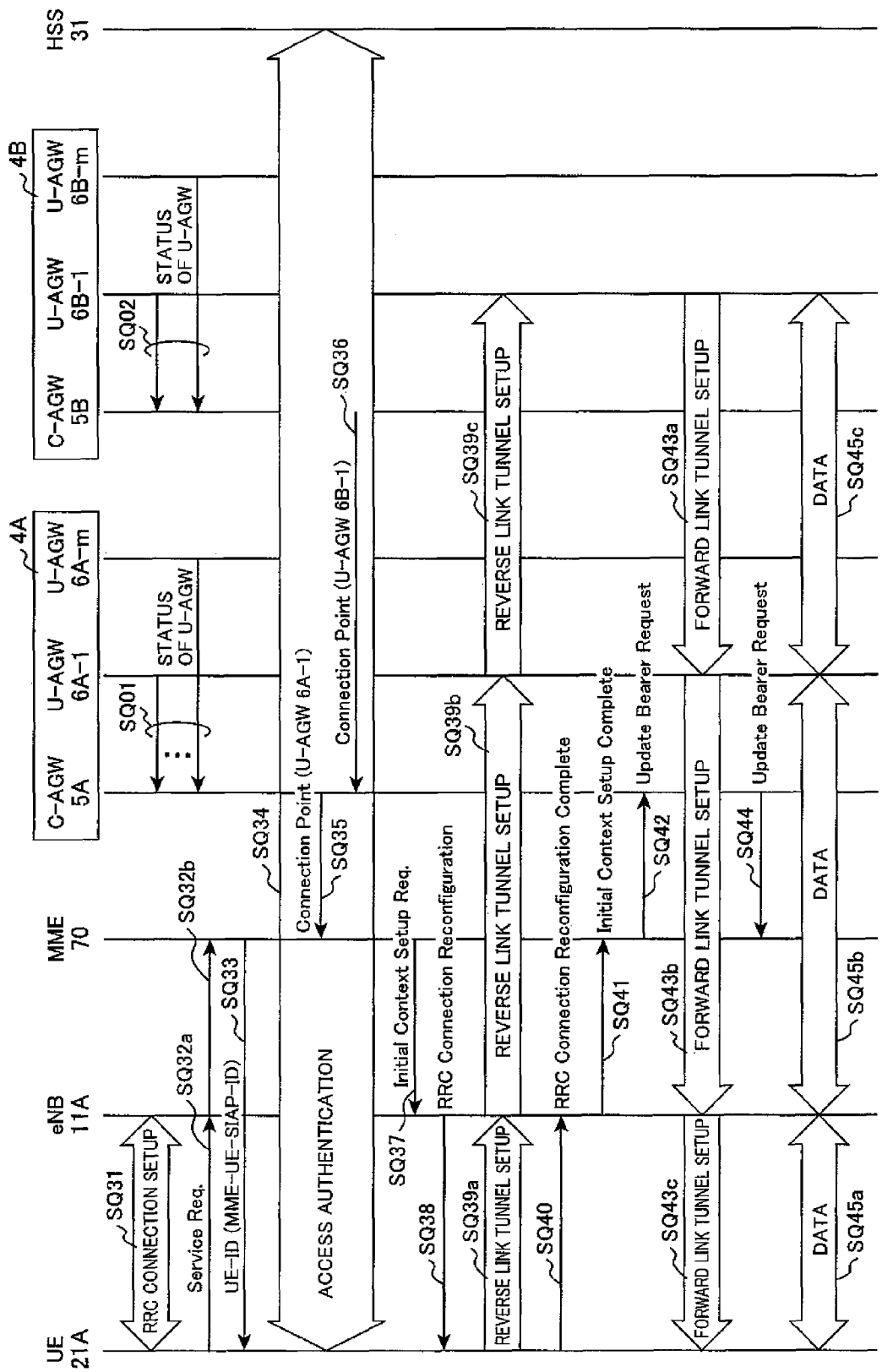
FIG. 17 is a signaling sequence diagram for the second embodiment of the present invention.

FIG. 17 illustrates an example of a signaling sequence for establishing tunnels for forwarding user data among the UE 21A, the eNB 11A, the S-GW 4A and the P-GW 4B when connecting the UE 21A to the core network 1.

In advance of transmitting a service request message, the UE 21A establishes an RRC connection with an eNB 11A (SQ31). When the UE 21A transmits a service request message to the eNB 11A (SQ32a), the eNB 11A forwards the received service request message to the MME 70 (SQ 32b). Upon receiving the service request message, the MME 70 assigns a call identifier (MME_UE_SIAP_ID) different for each UE to the user ID (UE-ID) specified in the received service request message and notifies the UE 21A of the call identifier (SQ33). Meanwhile, in the S-GW 4A, each of the U-AGWs 6A-1 to 6A-m periodically notifies the C-AGW 5A of its load status information (SQ01). Similarly, in the P-GW 4B, each of the U-AGWs 6B-1 to 6B-m periodically notifies the C-AGW 5B of its load status information (SQ02).

Upon receiving the call identifier (MME_UE_SIAP_ID) from the MME 70, the UE 21A starts an access authentication procedure with the HSS 31 via the C-AGW 5A of the S-GW 4A (SQ34). In the access authentication procedure, the C-AGW 5A of the S-GW 4A selects a U-AGW to be connected to the UE 21A, for example, a U-AGW 6A-1 being in the lowest load status by referring to the load status information of the U-AGWs 6A-1 to 6A-m and notifies the MME 70 of the IP address of the selected U-AGW 6A-1 as a connection point of the UE 21A (SQ35).

On the other hand, in the P-GW 4B, the C-AGW 5B selects a U-AGW to be assigned to the UE 21A, for example, a U-AGW 6B-1 being in the lowest load status by referring to the load status information of the U-AGWs 6B-1 to 6B-m. The IP address of the selected U-AGW 6B-1 is notified as a connection point of the UE 21A from the C-AGW 5B to the C-AGW 5A of the S-GW 4A (SQ36).

Upon receiving the connection point of UE 21A from the S-GW 4A, the MME 70 notifies the eNB 11A of the connection point by transmitting an Initial Context Setup Request message of S1-AP (S1 Application Protocol) which is an application layer protocol between eNB and MME (SQ37). The eNB 11A requests the UE 21A to establish a Data Radio Bearer (DRB) and a Signaling Radio Bearer (SRB) by transmitting an RRC Connection Configuration message (SQ38).

Upon receiving the RRC Connection Configuration message, the UE 21A establishes a reverse link (uplink) tunnel toward the eNB 11A (SQ39a). Then, the eNB 11A establishes a reverse link tunnel toward the U-AGW 6A-1 (SQ39b) and the U-AGW 6A-1 establishes a reverse link tunnel toward the U-AGW 6B-1 (SQ39a), whereby the UE 21A becomes transmittable uplink data.

The UE 21A having established the reverse link tunnel transmits an RRC Connection Configuration Complete message to the eNB 11A (SQ40). Upon receiving the RRC Connection Configuration Complete message, the eNB 11A transmits an Initial Context Setup Complete message indicating the IP address of the eNB 11A to the MME 70 (SQ41). The MME 70 notifies the C-AGW 5A in the S-GW 4A of the IP address of the eNB 11A by transmitting an Update Bearer Request message (SQ42). Upon receiving the Update Bearer Request message from the MME 70, the C-AGW 5A returns a reply message (Update Bearer Response) to the MME 70 (SQ44).

After establishing the reverse link (uplink) tunnel between the U-AGW 6A-1 and the U-AGW 6B-1 at SQ 39a, the U-AGW 6B-1 establishes a forward link (downlink) tunnel toward the U-AGW 6A-1 (SQ43a), the U-AGW 6A-1 establishes a forward link tunnel toward the eNB 11A (SQ43b), and the eNB 11A establishes a forward link tunnel toward the UE 21A (SQ43c), whereby downlink data transmission from the U-AGW 6B-1 to the UE 21A becomes possible. Then, as indicated by SQ45a to SQ45c, the UE 21A transits into the state capable of communicating user data with a correspondent UE connected to the core network 1, via the tunnels established among the e-NB 11A, the U-AGW 6A-1 and the U-AGW 6B-1.

When the UE 21A has moved into the coverage area of another eNB 11B from the coverage area of the eNB 11A, the sequence similar to FIG. 17 is performed by the eNB 11B, MME 70, S-GW 4A, and P-GW 4B in turn. In this case, each of the C-AGWs 6A-1 and 6B-1 decides the U-AGW to be the tunnel endpoint, similarly to the first embodiment, by determining whether the U-AGW switching condition is satisfied.

As apparent from the above-described embodiments, the C-AGW according to the present invention selects, in response to a tunnel setup request, a new U-AGW being in the lowest load status from among a plurality of U-AGWs belonging to the same AGW, but when AT (or UE) handover occurs in association with the tunnel setup request, the C-AGW estimates the load status of the new U-AGW in the case of switching the tunnel endpoint so as to designate the new U-AGW as the tunnel endpoint only when the estimated load status of the new U-AGW satisfies a predetermined switching condition.

According to the present invention, because the current U-AGW is assigned as the tunnel endpoint after the AT handover unless the estimated load status of the new U-AGW satisfies the switching condition, packets forwarding for the AT after the handover can be performed by the same U-AGW continuously. In the case where the tunnel endpoint has been changed, optimum load distribution among the U-AGWs can be achieved.

The present invention can also be applied to other wireless communication systems such as WiMax, in addition to the 3GPP2 UMB wireless communication system and the 3GPP LTE wireless communication system presented in the embodiments.

What is claimed is:

1. A mobile communication system comprising a plurality of base stations for communicating in wireless with mobile stations and an access gateway (AGW) connected to a core network, wherein tunnels for forwarding data packets are established between each of the base stations and the AGW,
the AGW comprising a control access gateway unit C-AGW) for control use to communicate control messages with each of said plurality of base stations via an access network and a plurality of user access gateway units (U-AGWs) for data forwarding, each of which communicates data packets with said plurality of base stations via the access network,
said C-AGW comprising:
a first management table for indicating load status information of each of said U-AGWs in association with an address of each of the U-AGWs; and
a controller that retrieves the address of a new U-AGW being in the lowest load status from said first management table when a tunnel setup request message including a mobile station identifier was received from one of said base stations, and returns to the base station a reply message designating the address of the new U-AGW as a tunnel endpoint.
wherein, when said tunnel setup request message has been transmitted from a base station to which a mobile station having said mobile station identifier is to be handed over, said controller estimates the load status of the new U-AGW in the case of changing the tunnel endpoint for the mobile station from a current U-AGW to the new U-AGW and designates, as the tunnel endpoint in the reply message, the address of the new U-AGW if the estimated load status satisfies a predetermined condition and the address of the current U-AGW if the estimated load status does not satisfy the predetermined condition,
wherein said C-AGW further has a second management table including a plurality of table entries, each of which indicates, in association with a mobile station identifier, an address of one of said base stations and an address of one of said U-AGWs to be endpoints of a tunnel, and
wherein when a tunnel setup request message was received from one of said base stations, the controller of said C-AGW searches the second management table for an objective table entry indicating the addresses of the base station and the current U-AGW being the endpoints of an existing tunnel corresponding to the mobile station identifier specified in the tunnel setup request message, so that when the objective table entry is not registered in the second management table, the controller registers a new table entry indicating, in association with the mobile station identifier, the address of the base station and the address of the new U-AGW to the second management table and returns the reply message designating the address of the new U-AGW as the tunnel endpoint to the base station, and when the objective table entry has already been registered in the second management table, the controller determines whether the predetermined condition is satisfied or not based on the estimated load status of the new U-AGW and the load status of the current U-AGW indicated in said first management table.

2. The mobile communication system according to claim 1, wherein, when the estimated load status of the new U-AGW does not satisfy the predetermined condition, the controller of said C-AGW rewrites the base station address in said objective table entry registered in said second management table to the address of the base station having transmitted the tunnel setup request message.

3. The mobile communication system according to claim 1, wherein, in the case where said tunnel setup request message requests to establish a second tunnel to be coexistent with a first tunnel being used by the mobile station having said mobile station identifier, the controller of said C-AGW registers to said second management table a new table entry indicating, in association with the mobile station identifier specified in the tunnel setup request message, the address of the base station having transmitted the tunnel setup request message and the address of the U-AGW designated as the tunnel endpoint in said reply message.

4. The mobile communication system according to claim 1, wherein said C-AGW further has a third management table including a plurality of table entries, each of which indicates, in association with a mobile station identifier, communication quality information to be ensured to a mobile station having the mobile station identifier; and
wherein the controller of said C-AGW searches the third management table for communication quality information corresponding to the mobile station identifier specified in said tunnel setup request message and estimates said load status of the new U-AGW in the case of changing the tunnel endpoint, based on the communication quality information and load status information of the new U-AGW indicated in said first management table.

5. The mobile communication system according to claim 4, wherein the controller of said C-AGW collects load status information periodically from each of said plurality of U-AGWs and stores the load status information into said first management table.

6. The mobile communication system according to claim 4, wherein the controller of said C-AGW updates the load status information of each of said U-AGWs stored in said first management table based on said second management table and said third management table.

7. An access gateway (AGW) to be located between a plurality of base stations for communicating in wireless with mobile stations and a core network, the access gateway (AGM) comprising:

a control access gateway unit (C-AGW) for control use to communicate control messages with each of said plurality of base stations via an access network; and a plurality of user access gateway a units (U-AGWs) for data forwarding, each of which communicates data packets with said plurality of base stations via the access network, said C-AGW comprising:

a first management table for indicating load status information of each of said U-AGWs in association with an address of each of the U-AGWs; and a controller that retrieves the address of a new U-AGW being the lowest load status from said first management table when a tunnel setup request message including a mobile station identifier was received from one of said base stations, and returns to the base station a reply message designating the address of the new U-AGW as a tunnel endpoint, wherein, when said tunnel setup request message has been transmitted from a base station to which a mobile station having said mobile station identifier is to be handed over, said controller estimates the load status of the new U-AGW in the case of changing the tunnel endpoint for the mobile station from a current U-AGW to the new U-AGW and designates, as the tunnel endpoint in the reply message, the address of the new U-AGW if the estimated load status satisfies a predetermined condition and the address of the current U-AGW if the estimated load status does not satisfy the predetermined condition, wherein said C-AGW further has a second management table including a plurality of table entries, each of which indicates, in association with a mobile station identifier, an address of one of said base stations and an address of one of said U-AGWs to be endpoints of a tunnel, and wherein when a tunnel setup request message was received from one of said base stations, the controller of said C-AGW searches the second management table for an objective table entry indicating the addresses of the base station and the current U-AGW being the endpoints of an existing tunnel corresponding to the mobile station identifier specified in the tunnel setup request message, so that when the objective table entry is not registered in the second management table, the controller registers a new table entry indicating, in association with the mobile station identifier, the address of the base station and the address of the new U-AGW to the second management table and returns the reply message designating the address of the new U-AGW as the tunnel endpoint to the base station, and when the objective table entry has already been registered in the second management table, the controller determines whether the predetermined condition is satisfied or not based on the estimated load status of the new U-AGW and the load status of the current U-AGW indicated in said first management table.

8. The access gateway according to claim 7, wherein, when the estimated load status of the new U-AGW does not satisfy the predetermined condition, the controller of said C-AGW rewrites the base station address in said objective table entry registered in said second management table to the address of the base station having transmitted the tunnel setup request message.

9. The access gateway according to claim 7, wherein, in the case where said tunnel setup request message requests to establish a second tunnel to be coexistent with a first tunnel being used by the mobile station having said mobile station identifier, the controller of said C-AGW registers to said second management table a new table entry indicating, in association with the mobile station identifier specified in the tunnel setup request message, the address of the base station having transmitted the tunnel setup request message and the address of the U-AGW designated as the tunnel endpoint in said reply message.

10. The access gateway according to claim 7, wherein said C-AGW further has a third management table including a plurality of table entries, each of which indicates, in association with a mobile station identifier, communication quality information to be ensured to a mobile station having the mobile station identifier; and wherein the controller of said C-AGW searches the third management table for communication quality information corresponding to the mobile station identifier specified in said tunnel setup request message and estimates said load status of the new U-AGW in the case of changing the tunnel endpoint, based on the communication quality information and load status information of the new U-AGW indicated in said first management table.

11. The access gateway according to claim 10, wherein the controller of said C-AGW collects load status information periodically from each of said plurality of U-AGWs and stores the load status information into said first management table.

12. The access gateway according to claim 10, wherein the controller of said C-AGW updates the load status information of each of said U-AGWs stored in said first management table based on said second management table and said third management table.

* * * * *